(12) United States Patent
Smith (10) Patent No.: US 9,967,510 B2
(45) Date of Patent: May 8, 2018

(54) TIMING UNINTERRUPTIBLE PROCESSES (75) Inventor: Gerard Smith, West Yorkshire (GB)

(73) Assignee: ECHOSTAR TECHNOLOGIES LLC, Englewood, CO (US)

( * ) Notice: Subject to any disclaimer, the term of this patent is extended or adjusted under 35 U.S.C. 154(b) by 830 days.

(21) Appl. No.: 13/420,204

(22) Filed: Mar. 14, 2012

(65) Prior Publication Data

US 2012/0239963 A1    Sep. 20, 2012

(30) Foreign Application Priority Data

Mar. 14, 2011   (EP) ..................... 11158142

(51) Int. Cl.
| | | |
|---|---|---|
| H04N 21/431 | (2011.01) | |
| H04N 21/438 | (2011.01) | |
| H04N 21/443 | (2011.01) | |
| H04N 21/458 | (2011.01) | |
| H04N 5/45 | (2011.01) | |
| H04N 5/50 | (2006.01) | |

(52) U.S. Cl.
CPC ............ *H04N 5/45* (2013.01); *H04N 5/50* (2013.01); *H04N 21/4383* (2013.01); *H04N 21/4438* (2013.01); *H04N 21/4583* (2013.01); *H04N 21/4316* (2013.01)

(58) Field of Classification Search
CPC ........... H04N 21/4316; H04N 21/4383; H04N 21/4438; H04N 21/4583
See application file for complete search history.

(56) References Cited

U.S. PATENT DOCUMENTS

| | | | |
|---|---|---|---|
| 6,070,186 A * | 5/2000 | Nishio | ............................ 725/92 |
| 6,392,716 B1 * | 5/2002 | Nagata | ..................... H04N 5/50 348/553 |
| 7,532,253 B1 * | 5/2009 | Greenberg | ............... H04N 5/45 348/563 |
| 2002/0034374 A1 * | 3/2002 | Barton | ............................. 386/46 |
| 2002/0057372 A1 * | 5/2002 | Cavallerano et al. | ........ 348/565 |

(Continued)

FOREIGN PATENT DOCUMENTS

| | | |
|---|---|---|
| EP | 2037676 A1 | 3/2009 |
| EP | 2136555 A1 | 12/2009 |
| WO | 0199415 A2 | 12/2001 |

OTHER PUBLICATIONS

European Patent Office, European Search Report for Application No. 11158142.7, dated Jul. 27, 2011.

(Continued)

*Primary Examiner* — Randy A Flynn
(74) *Attorney, Agent, or Firm* — Lorenz & Kopf LLP (57) ABSTRACT

The timing of an un-interruptible process in a set top box or other device can be automatically adjusted in response to user inputs to improve the user experience. A user instruction is received at an input of the user device that causes an uninterruptible process to begin or commence in the user device after a time delay measured from receipt of the initial instruction. One or more input of the device is monitored to determine whether a subsequent instruction is received within a time period. Based on this determination, the time delay applied to future un-interruptible processes is adjusted. By adjusting the time delay in response to user inputs, the time delay can be automatically matched to a user's preferences.

20 Claims, 4 Drawing Sheets

| Command/Instruction | Time After Previous Command (Seconds) | Cumulative Average Time Between Commands (Seconds) | Time Delay to Begin PIP Initiation (Seconds) |
|---|---|---|---|
| 1. | N/A | N/A | |
| 2. | 3 | 3 | 3.5 |
| 3. | 2.5 | 2.75 | 5 |
| 4. | 1.0 | 2.2 | 5 |
| 5. | 1.0 | 1.9 | 7 |
| 6. | 1.0 | 1.7 | 7 |
| 7. | 7 | 2.2 | 5 |

(56) References Cited

U.S. PATENT DOCUMENTS

| | | | |
|---|---|---|---|
| 2002/0062484 A1* | 5/2002 | De Lange | H04N 21/4312 725/105 |
| 2003/0084205 A1* | 5/2003 | Nakajima | H04N 21/26233 713/375 |
| 2006/0156374 A1* | 7/2006 | Hu et al. | 725/135 |
| 2006/0184261 A1* | 8/2006 | Ng et al. | 700/94 |
| 2006/0263044 A1* | 11/2006 | Kim | H04N 21/4383 386/298 |
| 2006/0280484 A1* | 12/2006 | Douniwa | H04N 9/7921 386/231 |
| 2007/0026828 A1 | 2/2007 | Goto | |
| 2007/0055980 A1* | 3/2007 | Megeid et al. | 725/28 |
| 2007/0268381 A1* | 11/2007 | Gastinger et al. | 348/231.2 |
| 2008/0092199 A1* | 4/2008 | McCarthy et al. | 725/133 |
| 2008/0320530 A1* | 12/2008 | Weaver | 725/87 |
| 2009/0013353 A1* | 1/2009 | Haziza | H04N 21/44222 725/40 |
| 2010/0138858 A1* | 6/2010 | Velazquez et al. | 725/33 |
| 2012/0222066 A1* | 8/2012 | Charania et al. | 725/34 |
| 2012/0233636 A1* | 9/2012 | Ma | H04N 21/4383 725/27 |

OTHER PUBLICATIONS

European Patent Office, Extended European Search Report, dated Jul. 27, 2014 for European Patent Application No. 111581142.7.

\* cited by examiner

| Command/Instruction | Time After Previous Command (Seconds) | Time Delay to Begin PIP Initiation (Seconds) |
|---|---|---|
| 1. (Cursor to channel 1) | N/A | 2.0 |
| 2. (Cursor to channel 2) | 1.5 | 3.5 |
| 3. (Cursor to channel 3) | 1.0 | 5.0 |
| 4. (Cursor to channel 8) | 8.0 | 3.5 |
| 5. (Cursor to channel 9) | 1.8 | 5.0 |
| 6. (Cursor to channel 10) | 1.9 | 3.5 |

FIG 3A

| Command/Instruction | Time After Previous Command (Seconds) | Time Delay to Begin PIP Initiation (Seconds) |
|---|---|---|
| 1. (Cursor to channel 1) | N/A | 2.0 |
| 2. (Cursor to channel 2) | 1.5 | 3.5 |
| 3. (Cursor to channel 3) | 3.0 | 3.5 |
| 4. (Cursor to channel 4) | 8.0 | 2.0 |
| 5. (No command) | N/A | 2.0 |

FIG 3B

| Command/Instruction | Time After Previous Command (Seconds) | Cumulative Average Time Between Commands (Seconds) | Time Delay to Begin PIP Initiation (Seconds) |
|---|---|---|---|
| 1. | N/A | N/A | |
| 2. | 3 | 3 | 3.5 |
| 3. | 2.5 | 2.75 | 5 |
| 4. | 1.0 | 2.2 | 5 |
| 5. | 1.0 | 1.9 | 7 |
| 6. | 1.0 | 1.7 | 7 |
| 7. | 7 | 2.2 | 5 |

FIG 3C

TIMING UNINTERRUPTIBLE PROCESSES

CROSS-REFERENCES TO RELATED APPLICATIONS

This Application claims priority to European Application No. 11158142.7, filed on Mar. 14, 2011.

TECHNICAL FIELD

The following discussion relates to timing of processes executing within a set top box or other user device.

BACKGROUND

User devices (such as set top boxes that receive television programs or other broadcast data) will often need to implement or undertake one or more uninterruptible processes. An uninterruptible process is generally a process that the user cannot halt or cancel part way through and that must therefore be executed to completion, at least during normal operation. In the context of set-top-boxes, for example, functions exist such as a "picture in picture" (PIP) function that allows one or more programs/channels to be displayed on a display device in one or more inset windows. PIP can be used when navigating a program guide such that the content of a selected channel is displayed in a window within the guide display. The channel may be selected, for example, by a user highlight as the channel guide is scrolled through. Once a channel is selected, perhaps to access details of a currently playing program, the set-top-box appropriately tunes to the selected channel and decodes the media data to display the channel/program in the PIP window. Tuning and initiating the display of the PIP window typically includes one or more uninterruptible processes, which can greatly slow down navigation of the guide if applied every time the user highlights a channel when scrolling through a program menu. Other types of interruptible processes exist, both in set-top-boxes for receiving broadcast media data and outputting media content to display devices and in other user devices such as media players, personal computers and the like.

It would be desirable to be able to compensate for these uninterruptible processes that have the potential to spoil the user's experience of a device.

SUMMARY

The invention is defined in the independent claims to which reference is now directed. Additional features are set forth in the dependent claims.

Embodiments of the invention provide a method for controlling the execution of a process in a user device, such as a set-top-box. An instruction is received at an input of the user device from the user and this instruction causes an uninterruptible process to begin or commence in the user device after a time delay, measured preferably from receipt of the initial instruction. The input, or inputs, of the device is/are monitored to determine whether a subsequent instruction is received from the user within a time period. Based on this determination, the time delay applied to future processes is adjusted. By adjusting the time delay in response to input from the user, the time delay can be automatically matched to a user's preferences.

The time period suitably comprises or consists of the time delay period itself, and the subsequent instruction causes the device not to initiate the uninterruptible process, such that the uninterruptible process is cancelled before it has begun. The step of adjusting the time delay period preferably therefore involves increasing it if a subsequent instruction is received within the time delay period and/or decreasing it if a subsequent instruction is not received within the time delay period.

The time period may additionally, or instead, comprise or consist of a period after the uninterruptible process has begun. In this instance, the step of adjusting the time delay preferably comprises increasing it if an instruction is received after the uninterruptible process has begun executing. The time delay period may, therefore, be increased if an instruction is received after the predetermined period and during a further period in which the uninterruptible process is executing.

The steps of receiving an initial instruction and determining whether a subsequent instruction is received within the time period may be performed a number of times. The adjustment to the time delay can then be based on the determinations, and in particular, the adjustment to the time delay may be based on the average value.

The method may involve determining the time, relative to an initial instruction, at which a subsequent instruction is received during the time period. This time value could then be used to determine the adjustment to the time delay, particularly by multiplying the time between the successive instructions by a predetermined factor. Alternatively, the time at which a subsequent instruction is received, relative to an initial instruction, could be compared with one or more threshold values and the time delay can be increased if the time at which the subsequent instruction is received is below a first threshold value. Similarly, the delay period can be decreased if the time at which the subsequent instruction is received is above a second threshold value. The first and second threshold values may be the same value, or different values.

Preferably, the uninterruptible process is the initiation of a picture in picture function, the initial instruction is a user request to view information regarding a first channel and the subsequent instruction is a user request to view information regarding a second channel. More specifically, the user device is a set top box that receives media content encoded according to an MPEG standard and the uninterruptible process is receipt of an intra coded frame, also known as an I-frame.

The invention may also be embodied in a user device comprising an input for receiving instructions, a memory arranged to store a parameter indicative of a time delay and a processor, coupled to the memory, for executing an uninterruptible process in response to an initial instruction being received at the input. The apparatus is arranged to execute the process after the time delay indicated by the parameter in memory. The processor is also arranged to determine when a subsequent instruction is received within a time period. The user device is configured to adjust the time delay parameter based on the determination of the processor.

The time period may comprise or consist of the time delay period itself, and the processor may be further arranged to prevent the uninterruptible process from initiating in response to receiving the subsequent instruction.

The time period may comprise or consist of a period after the uninterruptible process has begun, and wherein the user device is configured to adjust the time delay parameter by increasing it if an instruction is received after the uninterruptible process has begun executing.

Preferably the user device has a memory for storing data indicative of one or more instructions or instruction types that do not prevent the uninterruptible process from initiating, such as a volume change instruction.

The invention may be implemented in a computer program for carrying out the method steps described herein on a set top box or similar device.

BRIEF DESCRIPTION OF THE DRAWINGS

Examples will now be described in more detail, with reference to the drawings in which.

DETAILED DESCRIPTION OF THE EXAMPLE EMBODIMENTS

Figure 1:
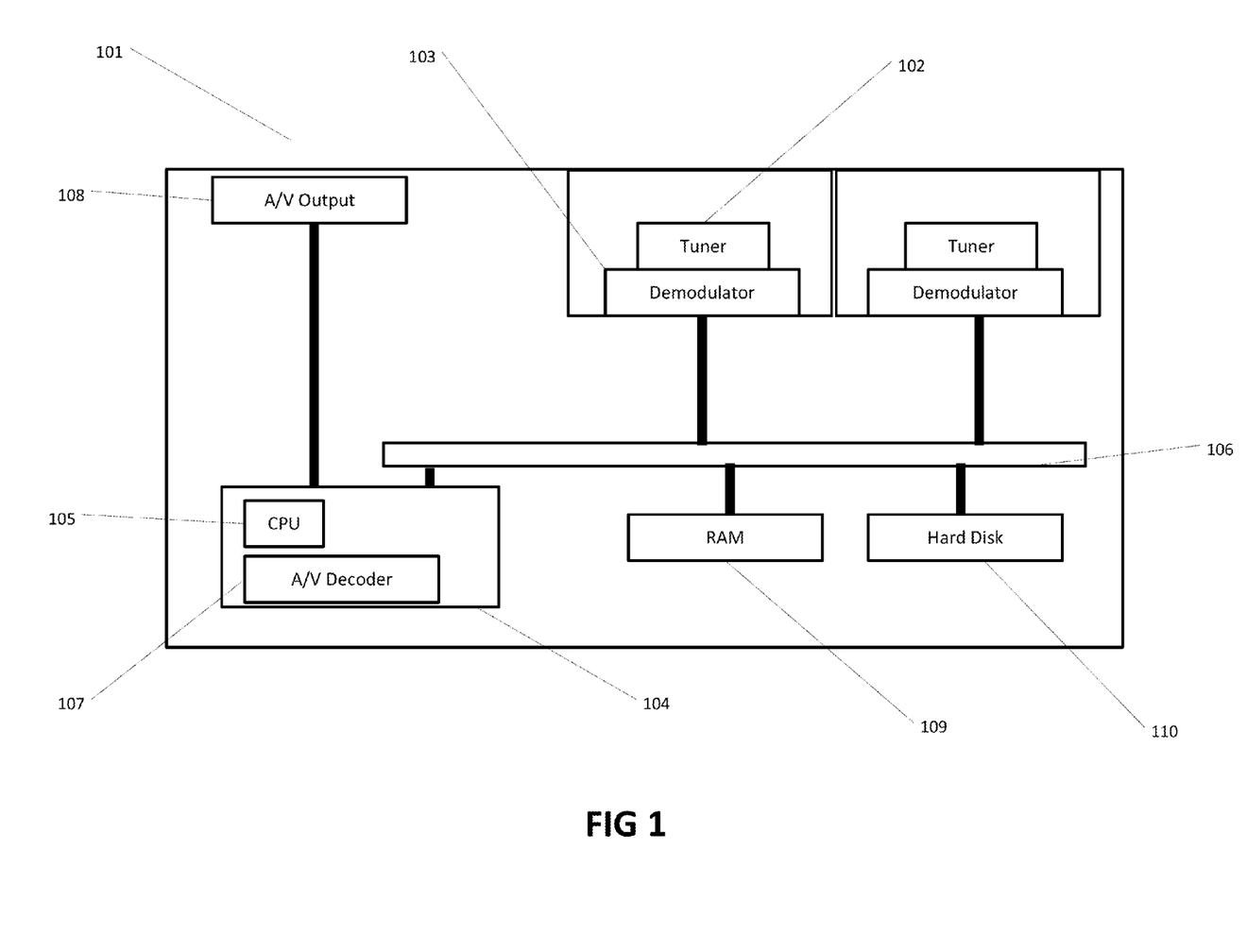
FIG. 1 is a diagram of a set-top-box in which embodiments of the present invention may be implemented.

A first example may be implemented with a set-top-box or other user device of the sort shown in FIG. 1. The set-top-box 101 comprises a receiver for receiving broadcast signals including encoded media content, such as video and audio content. The media content is provided to a processor for decoding and outputting the content. In the example of FIG. 1, a tuner 102 is included that tunes to and amplifies a particular analogue broadcast frequency, although a digital arrangement could be used for receiving digital broadcasts. A demodulator 103 converts the signal from the tuner into a digital signal that may be processed by the processor. The set-top-box may optionally be equipped to receive and process multiple broadcasts, for example by having tuner/demodulator packages that can each display/record a television channel simultaneously with the other channel.

The tuner/demodulator is connected to a processor chip 104, comprising a CPU 105, by a bus 106. The main processor 104 of the set-top-box runs the set-top-box software and controls and coordinates the other set-top-box components. The A/V decoder 107 is a digital processor responsible for decoding the audio and video data and is provided on the same physical chip as the CPU. The A/V decoder, which may also be provided as separate audio and video units, receives and decodes the signal provided by the demodulator. The decoded audio/video signals are provided to the A/V output 108, which provides an audio and video signal that can be connected to an output device or display device such as a television. The RAM 109 can be used by both the processor and the decoders. The hard disk 110 is optionally provided for storing recorded content for presentation at a later time. The hard disk can also be used to store metadata and parameters such as a time delay parameter as described below, or a flash memory, or any other type of memory, could alternatively, or in addition, be provided for this purpose.

The set-top-box also has the functionality to display picture in picture video. As mentioned above, picture in picture video allows media content such as a program or channel stream to be displayed in an inset window, smaller than the whole display device screen, simultaneously with another background. The background would commonly be a different program or channel, and typically occupies the full screen, or a significant portion thereof. The set-top-box also has the functionality to display PIP video while the user is navigating a program guide. If the guide is not superimposed over a background program or channel then the inset video may be referred to as "picture in guide", but for the purposes of simplicity picture in picture will be taken to also cover "picture in guide" in the present discussion. Program guides are well known features employed in set-top-boxes, sometimes known as an electronic program guide (EPG) or interactive program guide, and provide a display for users to access continuously updated menus displaying scheduling information for current and upcoming programs on different channels.

When a user accesses information for a particular channel the set-top-box begins the process of displaying PIP video for that channel, while the program guide is still displayed on the background. Typically, the user accesses information for a particular channel by controlling a cursor to highlight the channel of interest, the PIP process beginning when the cursor highlights the channel. The request to tune to the highlighted channel, and decode and display content, such as video content, from that channel can take some time, and will typically involve one or more processes or sub-processes that once initiated cannot be cancelled or stopped and must execute to completion.

In the present example uninterruptible processes may arise because the processor chip contains many different sub-systems or sub blocks, such as a tuning subsystem, audio decoder, video decoder and graphics sub-system. Each sub-system may comprise dedicated hardware for performing a particular function, and may operate semi autonomously under the supervision of the main CPU. Certain sub-systems are less flexible to being interrupted once they have begun performing a task than other sub-systems.

One example of a sub-system that may introduce an uninterruptible process is the video decoder or processor. When a request is made by the CPU to the video processor it may begin to execute software for decoding incoming content. In some systems, the initiation of the program cannot be interrupted or cancelled, at least until it has executed to a certain point. This may be caused by the particular encoding scheme used to encode the video file, in conjunction with restrictions in system architecture. For example, MPEG formats, such as MPEG-2 and MPEG-4, encode frames of video in relation to a reference frame. The first frame in a GOP (group of pictures) is the I-frame or intra coded frame. Subsequent frames, the P-frames (predictive coded frames) and B-frames (bi-directional coded frames) are coded relative to the I-frame. The I-frame is compressed without reference to any other frames and therefore requires a larger amount of data to the remainder of frames within the GOP. The GOP size is determined by the length, or number of frames, between subsequent I-frames. MPEG-2 uses a maximum GOP size of 18 for NTSC systems and 15 for PAL. This means that there is a 0.6 second delay between subsequent I-frames. With other encoding formats, such as MPEG-4, the difference can be larger since there is no upper limit on the GOP size, which is useful in achieving higher compression rates.

Since reference is made to the I-frame by the subsequent frames, it is necessary to wait for an I-frame to arrive at the video decoder before decoding can begin. This leads to a waiting period during which the video decoder is busy. The system architecture may not allow the video decoder to revert to the CPU to abort or cancel the operation, in which case there will be a period during which the system cannot perform further operations until the video decoder is able to begin decoding. This can be especially noticeable when accessing PIP within the EPG, since the user may want to scroll onwards to view information on a different channel, but the system cannot do so until the first I-frame is received, at which point the video decoder may be able to check for, or receive, a cancel signal.

In order to mitigate against such an uninterruptible process, a delay is provided between the initial instruction from the user to view details of a particular channel and beginning the PIP process to display inset video from that channel. During the delay period a subsequent instruction from the user received at the input can prevent the PIP process from beginning. The subsequent instruction may be one of one or more predetermined instructions. In particular, the subsequent instruction may be an instruction to move the cursor to a different channel, to highlight or select another channel in some other way, or to exit the program guide. In any case, the subsequent instruction causes the uninterruptible task not to begin at the end of the time delay.

A fixed predetermined delay may be used, but this may not suit the needs of every user. Some may like to wait for the PIP to appear before navigating to the next channel, whereas others may prefer to navigate away from a channel before the PIP appears. The set-top-box may therefore be arranged to automatically adjust the time delay based on a user's activities and in particular based on input from the user such as from a remote control or other input means.

If the user has previously waited for video to appear before moving the cursor again to a new channel, it can be assumed that the user prefers to see PIP video for each channel when navigating the guide. In this case the delay will be reduced relative to an initial value so that the uninterruptible portion of the PIP tune and video decode process will be initiated quickly following the cursor movement to a new channel. This will provide the user with video for the selected channel as quickly as possible, in line with the assumption about the user's requirements. On the other hand, if the user had made the last cursor movement quickly and had not waited for video to appear, it could be assumed that the user prefers to navigate quickly through the channels and prefers not to wait for PIP video to appear for each channel selected. In this case the initiation of the uninterruptible portion of the tune and video decode process would be delayed relative to an initial value to allow the user time to make a further change to the selected channel.

Figure 2A:
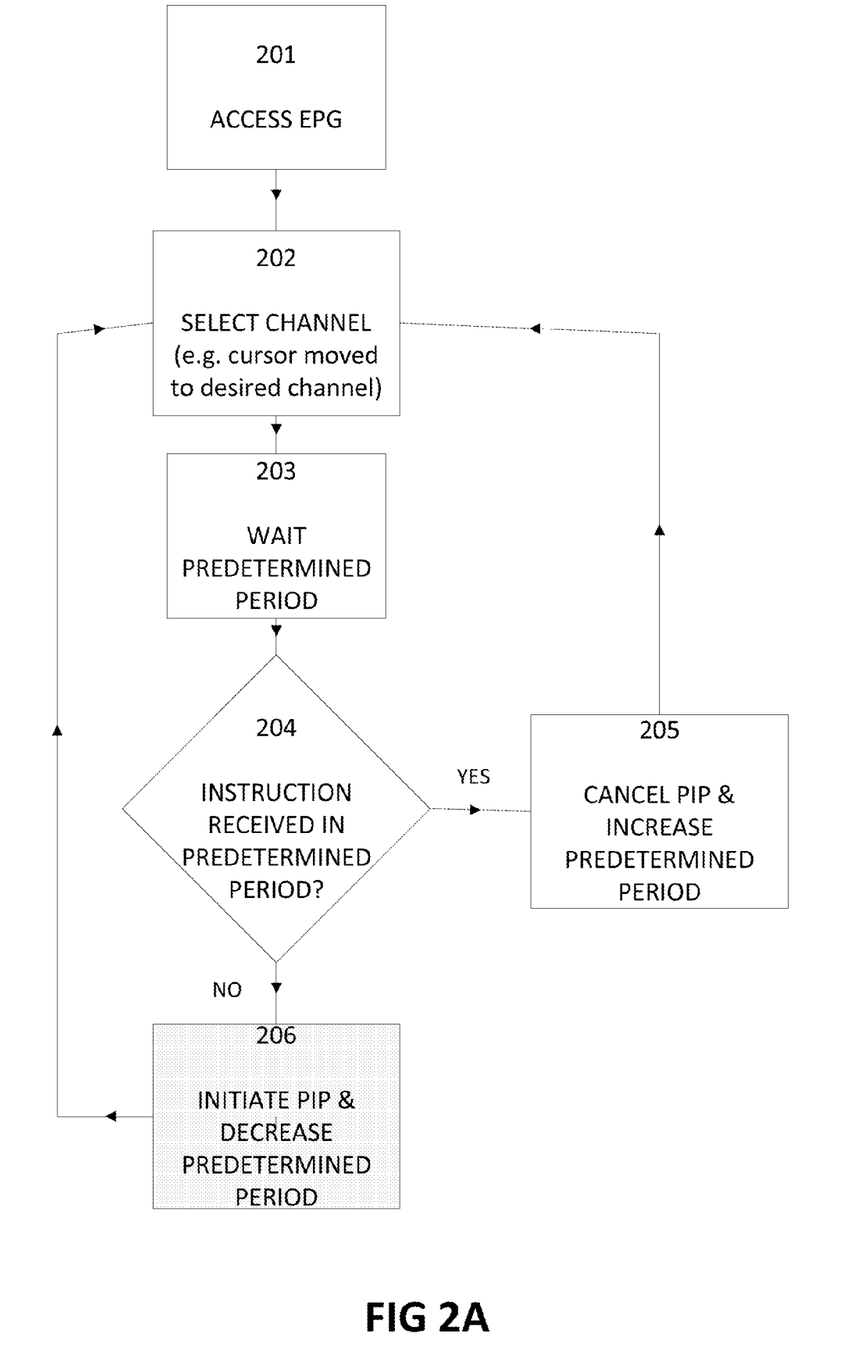
FIG. 2A is a flow diagram showing the steps involved in an example of the invention.

FIG. 2A shows an example of a method according to the present invention in relation to a set-top-box. FIG. 2A should not be considered to encompass all possible steps, and further steps may be included. At step 201 the set top box accesses the EPG guide, normally in response to input from a user via, for example, a remote control. After entering the EPG, a first channel is selected at step 202 based on input from the user. Once the channel is selected the system enters a waiting period 203, in which the set top box waits and monitors to determine whether any subsequent instruction is received after the initial instruction to select a particular channel. A decision 204 is taken depending upon whether a subsequent instruction is received within the predetermined period.

The first timing can begin after the occurrence of a cursor movement within the guide, but alternatively it could begin from the initial request for the guide, based on user input received at the set-top-box. Upon initialising the EPG often the first channel is often selected automatically according to the set top box default option. Subsequently, the channel selection will usually be controlled by the user. It should be noted, therefore, that the instruction to access the EPG could be considered an initial instruction since it may result in a program being selected. In such arrangements it is necessary to introduce a compensation period since the EPG program takes a certain amount of time to initiate and populate with information. This can be achieved by subtracting, from the period between requesting access to the EPG and a subsequent command, a time period corresponding to the initialisation, or the initialisation and population period required by the EPG. Alternatively, the timing could begin only once the EPG is loaded and populated with information.

If an instruction is received within the predetermined period then the PIP process is prevented from initiating at step 205. Action is also then taken by the set top box to increase the predetermined time period. Alternatively, if a subsequent instruction is not received in the predetermined period then the PIP process initiates as normal at step 206 and action is then taken by the set top box to decrease the predetermined time period. The process may repeat when the user selects another channel in the EPG. As will be described in more detail below, there are many different ways in which the predetermined time period can be altered. The predetermined period may not be altered every time the steps 201 to 205/206 of FIG. 2A occur, since the predetermined time period may be determined by, for example, threshold values, average values and/or value ranges such that small fluctuations in user habit do not adversely affect the predetermined period.

Figure 2B:
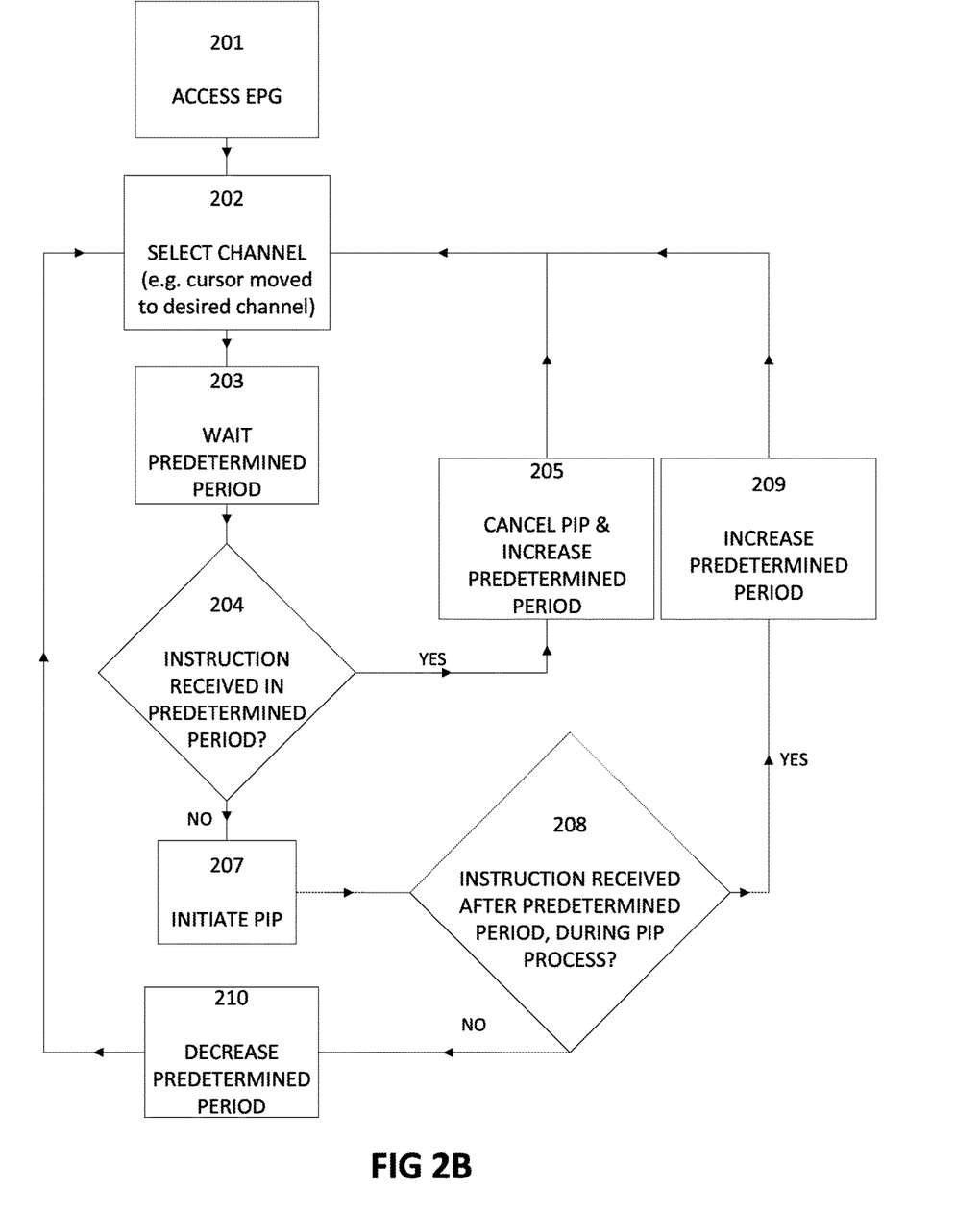
FIG. 2B is a flow diagram showing the steps involved in a further example of the invention.

FIG. 2B shows a further example of a method according to the present invention. Similar steps are given identical reference numbers. When a subsequent instruction is not received within the predetermined period, the PIP program is initiated. However, action is not taken to alter the predetermined period until a later time. At step 208 it is determined whether a subsequent instruction is received during the period, or at least a portion of the period, in which the uninterruptible portion of the PIP process is occurring. If a subsequent instruction is received, then the set top box takes action at step 209 to increase the predetermined time period. If a subsequent instruction is not received then the set top box takes action at step 210 to decrease the predetermined time period. For the avoidance of doubt, the method of determining whether an instruction is received during the period in which the uninterruptible process is executing, and adjusting the predetermined time delay accordingly, may be used independently and separately to the method of determining whether an instruction is received during the time delay period. This method may also be used in conjunction with any of the preferred features described herein.

Figure 3A:
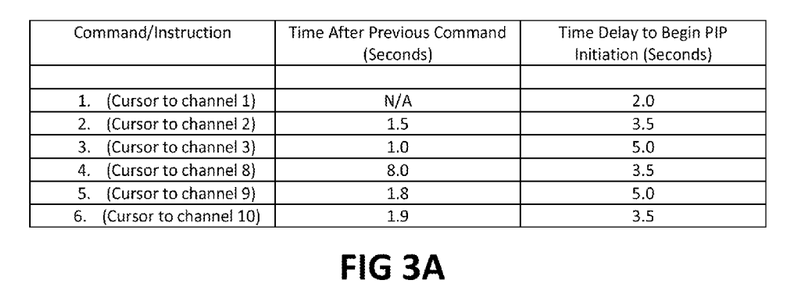
FIG. 3A is a table showing the time delay characteristics for an example of the invention.

In the simplest example the length of time delay prior to beginning an uninterruptible process is based on the immediately preceding action taken by the user. If the user sends a subsequent instruction, following an initial instruction, within a first time period, the subsequent time delay period is extended in length. Likewise, if the subsequent user instruction is not received until after the uninterruptible process has completed, or generally outside the previous time delay, the next time delay period is decreased. FIG. 3A shows an example of this in the context of PIP. The EPG is accessed at command 1, which may set the cursor to channel 1. The system is arranged to wait 2 seconds before PIP is commenced. However, within the 2 second period, at 1.5 seconds from the first command, the user scrolls to channel 2 by providing input to the set-top box via a remote control, physical input device, such as buttons, located on the set-top box, or any other type of input mechanism. The system detects this command and determines that it was received before the expiry of the time delay period. The system then changes the time delay period to a higher value by changing the time delay parameter stored in memory; in this example the time delay parameter is changed to 3.5 seconds. Likewise, with command 3 the system increases the time delay further. Command 4, on the other hand, is received after the time delay has expired and so the next time delay period is decreased.

Examples of the present invention could be based on the principle of increasing the time delay whenever a command is received before the expiry of a previous delay, but this could lead to very high values for the time delay making it difficult for the user to access PIP, or commence some other uninterruptible process, should they wish to. To avoid this, the time delay could be limited to a predetermined maximum value, such as 5 seconds. Once the time delay period has reached the maximum value, subsequent commands within the time delay period will not increase subsequent time delay periods. A predetermined limit could also, or instead, be put on the lowest possible value of the time delay if required. In a simple case the time delay could have two possible values, a maximum and a minimum, and be changed between these values depending upon the user's input. More preferably the time delay period can be changed to a number of predetermined values between the maximum and minimum values.

Figure 3B:
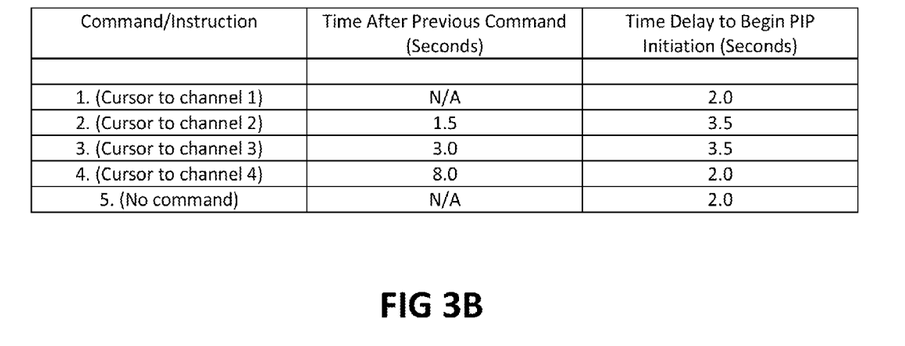
FIG. 3B is another table showing the time delay characteristics for an example of the invention.

A further example could be based on threshold values. Rather than the system comparing the time for a subsequent command to arrive after an initial command with the previous time delay period (i.e. the currently stored time delay period), the system could compare with a threshold value. Any delay between an initial command and subsequent command below the threshold value would cause an increase in the subsequent time delay period. Any delay above a second threshold value, which could be the same or different value as the first threshold value, would cause a decrease in the subsequent time delay period. This could be combined with maximum and/or minimum values for the time delays. The example of FIG. 3A could be considered to apply to an arrangement having a single threshold set to a value of 2 seconds above which the time delay is decreased and below which it is increased. In the example of FIG. 3B the lower threshold is set to 2 seconds and the upper threshold set to 4 seconds. The initial time delay period is pre-set at 2 seconds. The first command occurs and a subsequent command, 2, is received after 1.5 seconds. This value is lower than the lower threshold and so the time delay period value is increased for the next command, 3. Taking command 2 now as the initial command/instruction, the subsequent command/instruction 3, occurs 3 seconds after the initial command. This is between the upper and lower thresholds, so the time delay period value is not altered. Between commands 3 and 4 the elapsed time is 8 seconds in which time the PIP, or other uninterruptible task may have completed, and is higher than the upper threshold value, and so the time delay period is decreased. No command follows command 4, or a further command does not occur for a sufficiently long time, so the system does not change the time delay, although this is an optional feature and the system could instead decrease the stored time delay period value.

The time delay period values may be adjusted in increments, such as in the examples of FIGS. 3A and 3B where they are adjusted in 1.5 second steps. However, the value could instead be adjusted in relation to the amount of time between initial and subsequent commands, for example an amount equal to this time multiplied by a predefined factor, or any other relationship that achieves the aim of lengthening the time delay when the user's actions indicate they are not waiting for the uninterruptible process to commence or reducing the time delay when their actions indicate that they are. The system could determine the time at which the subsequent instruction arrived and determine whether this is above or below a threshold value. If the instruction time is below the threshold value the system would increase the predetermined time to activate the uninterruptible process by a value determined by multiplying the instruction time by a value such as, for example, 0.5. Likewise, if the instruction time is above the threshold value, the system would decrease the predetermined time in the same way, perhaps using the same or a different value. Two threshold values may be used in the manner described above.

The subsequent command may be received while the uninterruptible process is being executed and this may still be taken into account by the system. For example, the set-top-box may have begun to implement the PIP process, and the system could still take a user command into account even though the command cannot interrupt the process. Commands received during an uninterruptible process could cause the subsequent time delay period to be increased, as it is assumed that the user did not want the uninterruptible process to begin.

Previously described methods have relied upon changing the delay period to commence the uninterruptible process in response to the last command or action by the user. In such arrangements, although a series of commands can have a cumulative affect on the delay time, calculations are based on the time delay between the two most recent instructions from the user. An alternative would be to base the time delay on a statistical model based upon a user's command history.

Figure 3C:
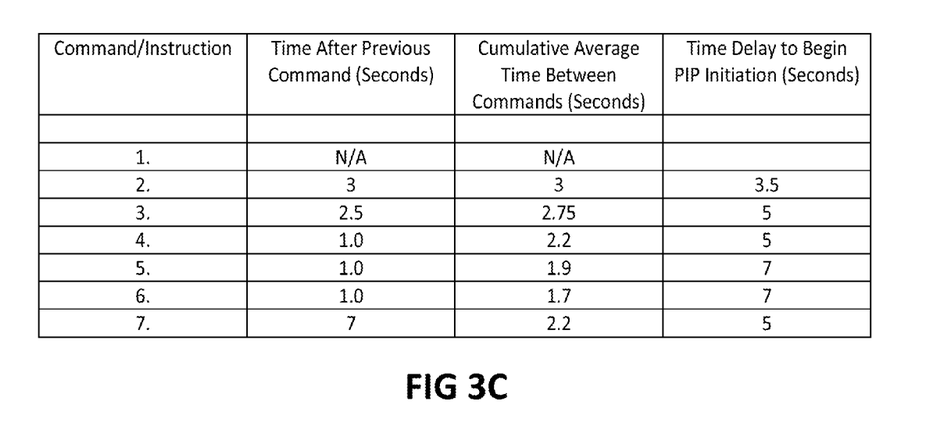
FIG. 3C is a further table showing the time delay characteristics for an example of the invention.

One example of an implementation of a statistical approach is illustrated in FIG. 3C. In this example, showing a sequence of instructions, the cumulative average time between consecutive instructions is calculated. The time delay at a particular point in time is determined based upon the calculated average. This builds up an average value for the user so that the time delay period required from a first instruction to commence an uninterruptible process is matched to the user's average habits. As can be seen from FIG. 3C, the user typically waits a relatively short time between consecutive instructions. The average time between successive instructions that are capable of preventing the system from commencing an uninterruptible process is therefore correspondingly small. The benefit is that the occasional change in user habit, as found at command 7 where the user waits considerably longer than previously to issue command 7, have less of an impact on the overall functioning of the system.

An additional optional feature used in the example of FIG. 3C is to provide different values for the time delay period corresponding to different value ranges of the cumulative average value of the times between instructions. In FIG. 3C an average value of 3 seconds and above corresponds to a time delay of 3.5 seconds, between 2 and 3 seconds corresponds to a 5 second delay and below 2 seconds a 7 second delay. The time delay could be directly related to the average value in a similar manner to the examples described above in which the time delay is based on the timing of the preceding instruction, but providing staged ranges or threshold bands in this way makes the system less sensitive to small fluctuations in user habit.

A simple alternative method would be to introduce a delay if the user issues a command before the PIP function begins. The user can then continue to issue commands and the PIP will not begin provided those commands are received within the delay period. The delay period need not be adjusted between successive commands unless the time between successive commands exceeds the delay period. Preferably in addition, if the user waits for the PIP function to begin, the time delay period can be set to zero or substantially zero. In essence, if the set top box receives a command that cancels or interrupts the PIP process then it is assumed that the user does not wish to view PIP and the delay is introduced. However, if the user has waited for PIP to begin then it is assumed that they wish this function to initialise as soon as possible. If a subsequent instruction is received during the PIP process, or before a certain portion of the PIP process has completed, the delay can be reintroduced once the uninterruptible process finishes. The time delay period may be determined relative to the time between the previous successive commands. The time delay would, in this instance, not be predetermined since it would depend upon the time between previous successive commands. The time delay may be set to a particular value greater than the time between the last two successive commands. For example, if the time between previous successive commands was 0.5 seconds, then the time delay could be adjusted to 0.5 seconds plus an additional period of 1 second. Thus, the user then has a 1.5 second period between successive commands to provide a further command and prevent the uninterruptible PIP process initiating.

In order to implement the methods described above the processor of a set-top-box could be used to determine the time between a first instruction and a second instruction based on input received at an input of the set-top-box such as an infra-red receiver for a remote control, which the user uses to provide instructions or commands to the set-top-box. The set-top-box would preferably include stored data, in the hard-drive, a flash memory or any other type of memory device, identifying one or more predetermined instructions. The stored data may indicate which instructions are appropriate instructions having the capability to prevent a particular uninterruptible process from operating. For example, with PIP displayed over an EPG, the data may indicate that a cursor scroll to highlight the next channel, or a channel selection within the EPG, or inputting a reference to another channel by entering the channel number "10" to view details within the EPG should prevent the uninterruptible process from operating. Instructions other than the stored predetermined instructions such as a volume change, for example, would not be listed or referenced in the data and so would not prevent the uninterruptible process from operating. Of course, the stored data may instead indicate those instructions that are not appropriate instructions to prevent an uninterruptible process from operating, and any other instructions not stored are assumed to be appropriate for preventing an uninterruptible process from initiating. For the avoidance of doubt, the embodiments of the invention may combine both approaches and contain data identifying both instructions that do cause an uninterruptible process from initiating and those that do not.

The processor preferably alters the time delay period, based on the detected period between relative commands, by altering a value stored in a memory coupled to the processor, the value indicating the time delay period. Alternatively, the processor may select the time delay period from a predetermined list of possible delays, each delay value corresponding to a range in which the previous, or average, time between appropriate instructions falls.

The examples of FIG. 3A-3C are shown over a relatively short number of instructions. In practice, the number of instructions would be larger, and would be updated each time the user activates the EPG. Because each user is different, it is preferable that users identify themselves before the processor starts determining time delays, preferably by having different user profiles that allow a user to be identified when the set-top-box is switched on or at a later time.

Although the above examples are given in the context of accessing PIP in an EPG, embodiments of the invention can be applied to any situation in which an uninterruptible process occurs that a user may want to avoid. For example, a set-top box or entertainment device may have a hard disk drive, or other type of memory, for storing content for viewing at a later date. The uninterruptible process may be accessing data from the memory. Arrangements are also known in which the content can be browsed through, to view details of the content such as a program synopsis or episode number, by using a graphical menu. When a particular program is highlighted or selected, for example by using a cursor, a preview of the program may be played in an inset window or in the background. In a similar manner to the PIP used in a program guide, the act of previewing the stored program may include one or more uninterruptible processes. The time delay before the one or more uninterruptible processes associated with displaying the preview begin executing can be controlled in the same manner described above for PIP. In particular, the device may be a personal video recorder (PVR) or digital video recorder (DVR), or a set-top box or entertainment device that includes a PVR or DVR. The preview may be provided as distinct content, and could be considered a self contained preview which may be received via download and stored on the PVR. The preview may be pre-selected by a broadcaster. Alternatively the preview may comprise portions of the stored program content.

Embodiments of the invention have been described in relation to set-top-boxes for receiving and descrambling broadcast video and accompanying audio data, particularly over the air. This is not a limitation of the invention, which may equally be applied to any device in which uninterruptible processes of the type described above occur. This would include televisions with inbuilt set-top-boxes, computers, mobile phones or similar mobile devices such as tablet PCs, PDAs, radios and so forth.

Another example in which system architecture may lead to uninterruptible process includes digital cameras. Uninterruptible processes may occur when the user browses through photos stored on the camera. The camera may provide a list of photos, or a set of thumbnails that the user can select. The camera can be arranged to present the photo on a larger portion of the screen, at the same time as displaying the list or thumbnails, if the user leaves the cursor on the thumbnail selected for a certain period of time. This can lead to an uninterruptible process as the camera renders the larger image on the screen. Therefore, elements described above in relation to PIP can find utility in this, and other similar applications.

As mentioned above, an uninterruptible process is one that cannot be halted or cancelled part way through by the user and must be executed to completion, at least during normal operation. An uninterruptible process, therefore, may be considered a process that a system cannot cancel, or halt, during execution, and which prevents the user device from undertaking one or more operations. Uninterruptible process may be caused by system architecture, due to the manner in which operations are carried out, and the hardware and controlling software used.

The term "broadcasting" should also be taken to encapsulate delivery of data by any form such as over the air, via the Internet, cable or satellite or any other type of transmission.

Embodiments of the invention have been described in relation to user devices for displaying multimedia content such as video or images. In particular, the invention finds particular utility in set-top-boxes for receiving and descrambling broadcast video and accompanying audio data. It will be appreciated that the term "set-top-box" may include any device able to impart the required functionality to a television receiver, whether provided in a standalone box, incorporated in a standalone box with other devices, or integrated within the television receiver. This would include televisions with inbuilt set-top-boxes, suitably programmed computers having the appropriate receiver functionality or connected to the internet or other network, mobile phones or similar mobile devices able to output media content, PDAs and so forth. The invention could also be applied to audio only devices such as radios, including digital radios.

The invention claimed is:

1. A method executable by a user device having a processor to control the execution of a process in the user device, the method comprising the steps of:
receiving an initial instruction by the user device from the user, wherein the initial instruction instructs the user device to begin decoding a video stream, wherein the decoding is an uninterruptible process that cannot be halted or cancelled part way through by the user during normal operation of the user device;
determining, by the user device, whether a subsequent instruction is received from the user within a time period following the initial instruction, wherein the subsequent instruction instructs the user device to begin decoding a second video stream;
if no subsequent instruction is received from the user during an adjustable time delay following the initial instruction, the user device beginning the decoding of the first video stream after the adjustable time delay;
if no subsequent instruction is received from the user during the time period, the user device automatically decreasing the adjustable time delay so that future decoding of the second video stream begins more quickly after receipt of a future instruction from the user than the decoding of the first video stream in response to the initial instruction; and
if the subsequent instruction is received from the user during the time period, the user device not beginning decoding of the first video stream and automatically increasing the adjustable time delay so that future decoding of the second video stream begins more slowly after receipt of a future instruction from the user.

2. A method according to claim 1 wherein the steps of receiving the initial instruction and determining whether the subsequent instruction is received within the time period is performed a plurality of times, and wherein the adjustable time delay is adjusted based on the plurality of determinations.

3. A method according to claim 1 further comprising determining the time, relative to the initial instruction, at which the subsequent instruction is received during the adjustable time delay and using said determined time to determine the adjustment to the adjustable time delay.

4. A method according to claim 1 further comprising the step of comparing the time at which the subsequent instruction is received, relative to the initial instruction, with one or more threshold values and adjusting the adjustable time delay depending upon whether said time is above or below the threshold value or values.

5. A method according to claim 4 wherein the adjustable time delay is increased if the time at which the subsequent instruction is received is below a first threshold value and the adjustable time delay is decreased if the time at which the subsequent instruction is received is above a second threshold value.

6. A method according to claim 5 wherein the first and second threshold values have different values, and wherein the adjustable time delay is not altered if the time at which the subsequent instruction is received is between the first and second threshold values.

7. A method according to claim 1 wherein if an instruction is received before the uninterruptible process begins, the adjustable time delay is set to a first value until the time between subsequent instructions exceeds the first value; and
if no instruction is received before the uninterruptible process initiates the adjustable time delay is set to substantially zero.

8. A method according to claim 1 wherein, if an instruction is received before the uninterruptible process begins, the adjustable time delay is set to a value determined by adding a predetermined period to the time between two previous successive instructions.

9. The method according to claim 1 wherein the user device is incorporated into a set-top-box for receiving broadcast content and outputting the content to a display device and wherein the uninterruptible process is the initiation of a picture in picture function, the initial instruction is a user request to view information regarding a first channel and the subsequent instruction is a user request to view information regarding a second channel.

10. The method of claim 9 wherein set top box receives media content encoded according to an MPEG standard and the uninterruptible process is receipt of an intra coded frame.

11. A method according to claim 1 wherein the time period includes a period after the uninterruptible process has begun, and wherein the step of automatically adjusting the adjustable time delay comprises increasing the adjustable time delay if an instruction is received after the uninterruptible process has begun executing.

12. The method of claim 1 wherein the adjustable time delay is automatically adjusted based upon an average time between the initial instruction and the subsequent instruction.

13. The method of claim 1 wherein the user device selects the adjustable time delay from a list of possible time delays, wherein each possible time delay corresponds to a range of time between the initial instruction and the subsequent instruction.

14. The method of claim 1 wherein the user device selects the adjustable time delay from a list of possible time delays, wherein each possible time delay corresponds to a range of previous times between the initial instruction and the subsequent instruction.

15. The method of claim 1 wherein the user device selects the adjustable time delay from a list of possible time delays, wherein each possible time delay corresponds to a range of average times between the initial instruction and the subsequent instruction.

16. A user device comprising:
a memory arranged to store a parameter indicative of an adjustable time delay;
a processor, coupled to the memory, for executing a decoding of a first video stream in response to an initial instruction from the user being received by the user device, wherein the decoding is an uninterruptible process that cannot be halted by the user device until the process is completed by the user device;

wherein the processor is further arranged to delay execution of the uninterruptible process until after the adjustable time delay indicated by the parameter in the memory has elapsed;

and wherein the processor is further arranged to:
determine whether a subsequent instruction from the user is received within the adjustable time delay, wherein the subsequent instruction instructs the user device to begin decoding a second video stream;

if the subsequent instruction is received during the adjustable time delay, prevent the execution of the uninterruptible process and automatically increase the adjustable time delay so that future decoding of the second video stream begins more slowly after receipt of a future instruction from the user, and to otherwise execute the uninterruptible process after the adjustable time delay has elapsed; and if no subsequent instruction is received during a time period, automatically decrease the adjustable time delay so that future decoding of the second video stream begins more quickly after receipt of the future instruction from the user.

17. A user device according to claim 16 wherein the adjustable time delay is increased if an instruction is received during the execution of the uninterruptible process.

18. A user device according to claim 16 wherein the memory is further configured for storing data indicative of one or more instructions or instruction types that do not prevent the uninterruptible process from initiating.

19. A method executable by a television receiver device having a processor to control the execution of a process in the television receiver device, the method comprising:

receiving an initial instruction from a user directing the television receiver device to select programming from a first channel for playback to the user, wherein the selecting of programming from the first channel is an uninterruptible process that cannot be halted until the process is completed by the television receiver device;

delaying initiation of the initial instruction to select the programming from the first channel for an adjustable time delay following the initial instruction;

determining, by the television receiver device, whether a subsequent instruction to select a different channel for playback to the user is received from the user within a time period following the initial instruction;

if a subsequent instruction is received from the user within the time period, the television receiver device cancelling the uninterruptible process to select playback of the programming from the first channel for playback to the user and automatically increasing the adjustable time delay so that future execution of the uninterruptible process begins more slowly after receipt of a future instruction from the user; and if no subsequent instruction is received within the time period, the television receiver device initiating the uninterruptible process to select the programming from the first channel for playback to the user and automatically decreasing the adjustable time delay so that future execution of the uninterruptible process begins more quickly after receipt of the future instruction from the user.

20. The method according to claim 19 wherein the receiving occurs during presentation of an electronic program guide and wherein the programming from the first channel is selected for playback in a picture-in-picture window of the electronic program guide.

* * * * *